United States Patent
Gates et al.

(10) Patent No.: US 7,938,105 B2
(45) Date of Patent: May 10, 2011

(54) HIGH FLOW (DELTA P) DIFFERENTIAL PRESSURE EGR SYSTEM WITH PROVISION FOR BOTH FLOW CONTROL AND OBD MONITOR

(75) Inventors: Freeman Gates, Bloomfield Hills, MI (US); Hossein Bina, Ann Arbor, MI (US); Joseph Grandas, Dearborn, MI (US); Gitanjli McRoy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 896 days.

(21) Appl. No.: 11/860,676

(22) Filed: Sep. 25, 2007

(65) Prior Publication Data

US 2009/0077967 A1     Mar. 26, 2009

(51) Int. Cl.
*F02B 47/08* (2006.01)
*F02B 47/04* (2006.01)

(52) U.S. Cl. ............................ 123/568.12; 60/605.2

(58) Field of Classification Search ............ 123/568.16, 123/568.22, 568.12, 568.17, 547, 676; 701/108; 60/605.2; 73/861.42
See application file for complete search history.

(56) References Cited

U.S. PATENT DOCUMENTS

| | | | |
|---|---|---|---|
| 790,888 A | | 5/1905 | Ferris |
| 3,889,536 A | | 6/1975 | Sylvester |
| 4,083,244 A | * | 4/1978 | Agar et al. ................ 73/204.21 |
| 4,282,751 A | | 8/1981 | Brown et al. |
| 4,489,595 A | * | 12/1984 | Klomp et al. ............... 73/114.37 |
| 4,555,952 A | * | 12/1985 | Jenkins ....................... 73/861.47 |
| 5,167,147 A | | 12/1992 | Peters et al. |
| 5,190,017 A | * | 3/1993 | Cullen et al. ................... 123/676 |
| 5,203,313 A | | 4/1993 | Rotarius |
| 6,009,862 A | | 1/2000 | Wanat et al. |
| 6,182,644 B1 | | 2/2001 | Kotwicki et al. |
| 6,347,519 B1 | * | 2/2002 | Kreso ............................. 60/602 |
| 6,604,424 B1 | * | 8/2003 | Kawabe et al. ................ 73/716 |
| 6,850,833 B1 | | 2/2005 | Wang et al. |
| 2005/0109113 A1 | * | 5/2005 | Baba ............................. 73/700 |
| 2005/0217650 A1 | | 10/2005 | Yu et al. |
| 2006/0107933 A1 | * | 5/2006 | Dilley et al. ............. 123/568.12 |

FOREIGN PATENT DOCUMENTS

| | | |
|---|---|---|
| GB | 1512290 | 11/1975 |
| WO | 01/75287 | 10/2001 |

OTHER PUBLICATIONS

United Kingdom Intellectual Property Office, Search Report of GB0816233.1, Oct. 3, 2008, 1 page.

* cited by examiner

*Primary Examiner* — Mahmoud Gimie
(74) *Attorney, Agent, or Firm* — Julia Voutyras; Alleman Hall McCoy Russell & Tuttle LLP

(57) ABSTRACT

In one approach, a method for measuring exhaust gas recirculation flow in an engine is provided. The method comprises separating EGR flow into at least a first flow and a second flow, passing the separated first flow through a restriction region, where the first flow passes through the restriction region separately from the separated second flow, combining the separated second flow and inducting the combined flows into a cylinder of the engine, where the EGR flow is separated and then combined within a common EGR passage.

20 Claims, 6 Drawing Sheets

HIGH FLOW (DELTA P) DIFFERENTIAL PRESSURE EGR SYSTEM WITH PROVISION FOR BOTH FLOW CONTROL AND OBD MONITOR

BACKGROUND/SUMMARY

Exhaust gas recirculation (EGR) is a technique that may reduce $NO_x$ (e.g., nitrogen oxide and nitrogen dioxide) gases in an exhaust stream produced by diesel turbocharged engines. EGR works by recirculating a portion of the exhaust gas flow discharged by an engine back to the cylinders of the engine. The overall combustion process is thereby slowed and cooled. As $NO_x$ gases are more readily formed at higher temperatures, the formation of $NO_x$ gases may thus be reduced. Errors in the flow of recirculated gas, however, may cause various issues. For example, the introduction of higher amounts of recirculated exhaust gas may result in retarded engine performance while lower amounts may increase NOx gas formation and the creation of engine ping.

Metering of the amount of recirculated gas processed by an EGR system may be achieved in part by measuring the overall volumetric flow rate of recirculated gas through the system. Typically, this measurement may be made by passing the entire recirculated gas flow stream through an orifice that is formed by an orifice plate and measuring the resulting pressure drop across the plate. An overall EGR volumetric flow rate may then be calculated via application of Bernoulli's equation, for example.

Such orifice plate flow measurement configurations may introduce excessive flow restriction to an EGR system and may therefore require that a larger orifice be utilized to ameliorate flow restriction effects. With larger orifice diameters, however, the capability of such a configuration to accurately measure a pressure drop across the orifice at lower volumetric flow rates is reduced, and overall packaging issues may arise in the engine compartment.

The inventors herein have realized that a flow measurement configuration that decreases restriction to flow and allows for a larger dynamic flow measurement range may be advantageous. In one approach, a method for measuring exhaust gas recirculation flow in an engine is provided. The method comprises separating EGR flow into at least a first flow and a second flow, passing the separated first flow through a restriction region, where the first flow passes through the restriction region separately from the separated second flow, combining the separated second flow and inducting the combined flows into a cylinder of the engine, where the EGR flow is separated and then combined within a common EGR passage.

In this way, it may be possible to maintain sufficient dynamic measurement range (for higher and lower EGR flows), while reducing overall EGR restriction. Thus, desired overall EGR system packaging may be achieved.

Note that various approaches may be used for separating the EGR flow, such as dividing a tubular passage of the EGR system, providing a plurality of EGR passages, etc. Further, note that various restrictions may form the restriction region, such as via an integrated or separately formed orifice. Finally, note that the common EGR passage may be a common tubular assembly, separate tubes coupled together via various valves, etc.

In another approach, another method for measuring exhaust gas recirculation (EGR) flow in an engine may be used. The method may comprise: separating EGR flow into two separated flows including a first separated flow and a second separated flow; passing the separated first flow through a flow restriction region, where the first flow passes through the flow restriction region separately from the second flow; combining the first and second separated flows and inducting the combined flows into a cylinder of the engine, where the EGR flow is controlled by a common EGR valve, and where the second separated flow includes a greater mass flow than the first separated flow; and correlating the first separated flow to the combined flow and adjusting the EGR valve in response thereto.

In this way, accurate control of both higher and lower EGR flows through the EGR valve can be achieved, while reducing impacts on engine packaging in the engine compartment.

DETAILED DESCRIPTION

Figure 1:
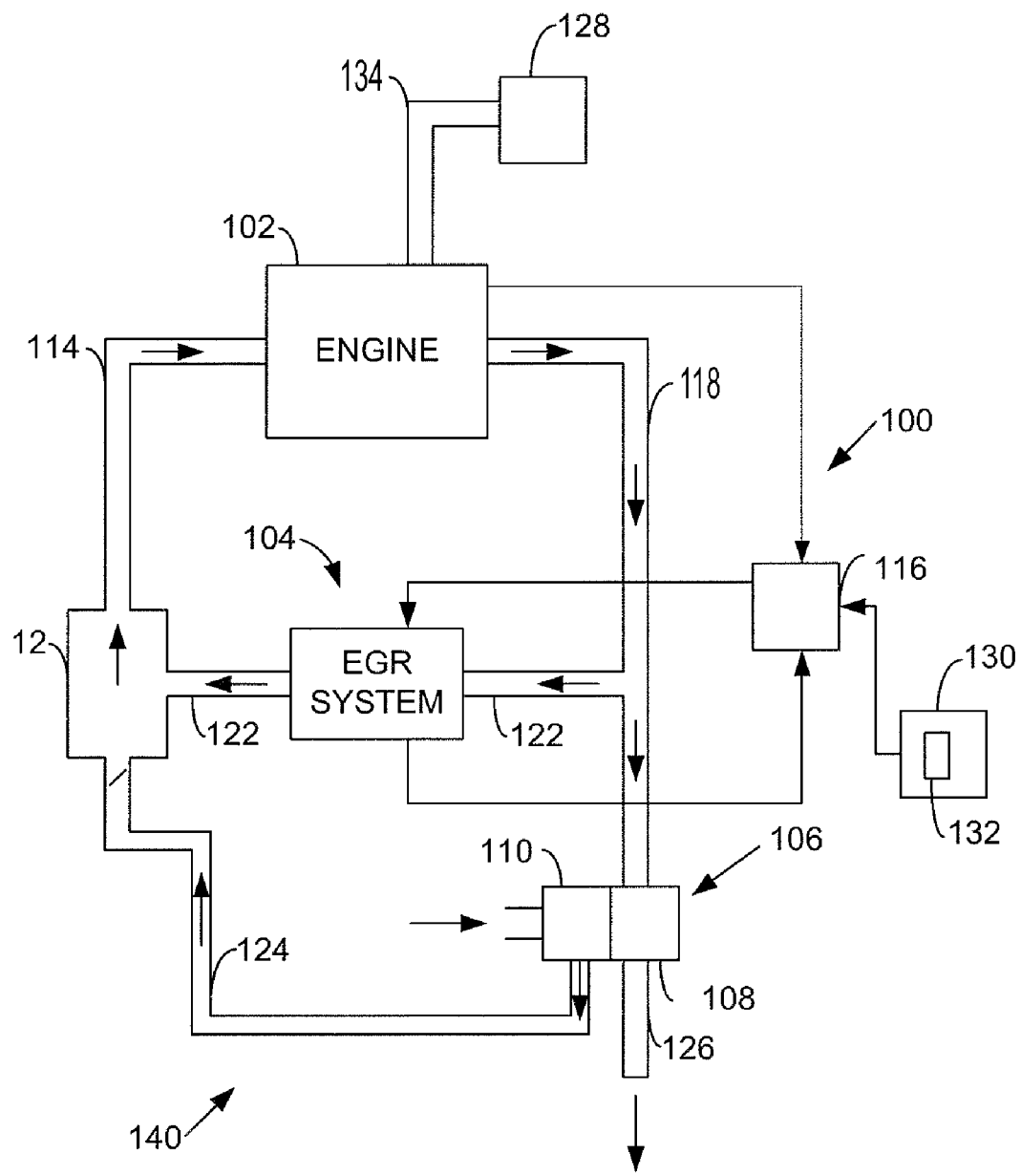
FIG. 1 illustrates an exhaust system for processing exhaust gases of an internal combustion engine.

FIG. 1 illustrates an exhaust system 100 for processing exhaust gases of an internal combustion engine 102. As one non-limiting example, engine 102 includes a diesel engine that produces a mechanical output by combusting a mixture of air from the intake system 140 and diesel fuel that it receives from fuel system 128 via fuel passage 134. Alternatively, engine 102 may include other types of engines such as gasoline-burning engines, alcohol-burning engines and combinations thereof, among others. Further, engine 102 may be configured in a propulsion system for a vehicle. Alternatively, engine 102 may be operated in a stationary application, for example, as an electric generator. While exhaust system 100 may be applicable to stationary applications, it should be appreciated that exhaust system 100 as described herein, is particularly adapted for vehicle applications.

Exhaust system 100 may also include one or more of the following: an exhaust gas recirculation (EGR) system 104 that receives a portion of an exhaust gas stream exiting engine 102 and an air intake manifold 112 that supplies fresh air and recirculated exhaust gas to engine 102. Under some conditions, EGR system 104 may be used to regulate the temperature and or dilution of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing. Also, EGR system 104 is shown forming a common EGR passage from the exhaust system to the intake system.

Exhaust system 100 may also include a turbocharger 106. Turbocharger 106 may be include a turbine 108 and a compressor 110 coupled on a common shaft. The blades of turbine 108 may be caused to rotate about the common shaft as a portion of the exhaust gas stream discharged from engine 102 impinges upon the blades of the turbine. Compressor 110 may be coupled to turbine 108 such that compressor 110 may be actuated when the blades of turbine 108 are caused to rotate. When actuated, compressor 110 may then direct pressurized fresh air to air intake manifold 112 where it may then be directed to engine 102. While FIG. 1 shows a high pressure EGR system, the EGR system may also be coupled between downstream of the turbine and upstream of the compressor.

Engine 102 may be controlled at least partially by a control system including controller 116 and by input from a vehicle operator via an input device 130. In this example, input device 130 includes an accelerator pedal and a pedal position sensor 132 for generating a proportional pedal position signal PP. As non-limiting examples, controller 116 may also at least partially control EGR system 104 via inputs from engine 102, input device 130, and EGR system 104.

Additionally, exhaust system 100 may include a plurality of passages for fluidically coupling the various exhaust system components. For example, as illustrated by FIG. 1, turbocharger 106 may be fluidically coupled to engine 102 by exhaust passage 118 and EGR system 104 may be fluidically coupled to engine 102 via exhaust passages 118 and 122. Additionally, EGR system 104, turbocharger 106, and engine 102 may be fluidically coupled to air intake manifold 112 via exhaust passages 122, 124, and 114, respectively. Exhaust gases may be permitted to flow from turbocharger 106 via exhaust passage 126 to a selective catalytic reduction (SCR) catalyst and/or to a noise suppression device, neither of which are illustrated by FIG. 1. Subsequently, exhaust gases may then be released to the ambient environment via an exhaust passage that is also not illustrated by FIG. 1.

Furthermore, it should be appreciated that the various portions of the exhaust system coupling the various exhaust system components may include one or more bends or curves to accommodate a particular vehicle arrangement. Further still, it should be appreciated that in some embodiments, exhaust system 100 may include additional components not illustrated in FIG. 1, such as various valves, pumps, restrictions, etc., or may omit components described herein, or combinations thereof.

Figure 2:
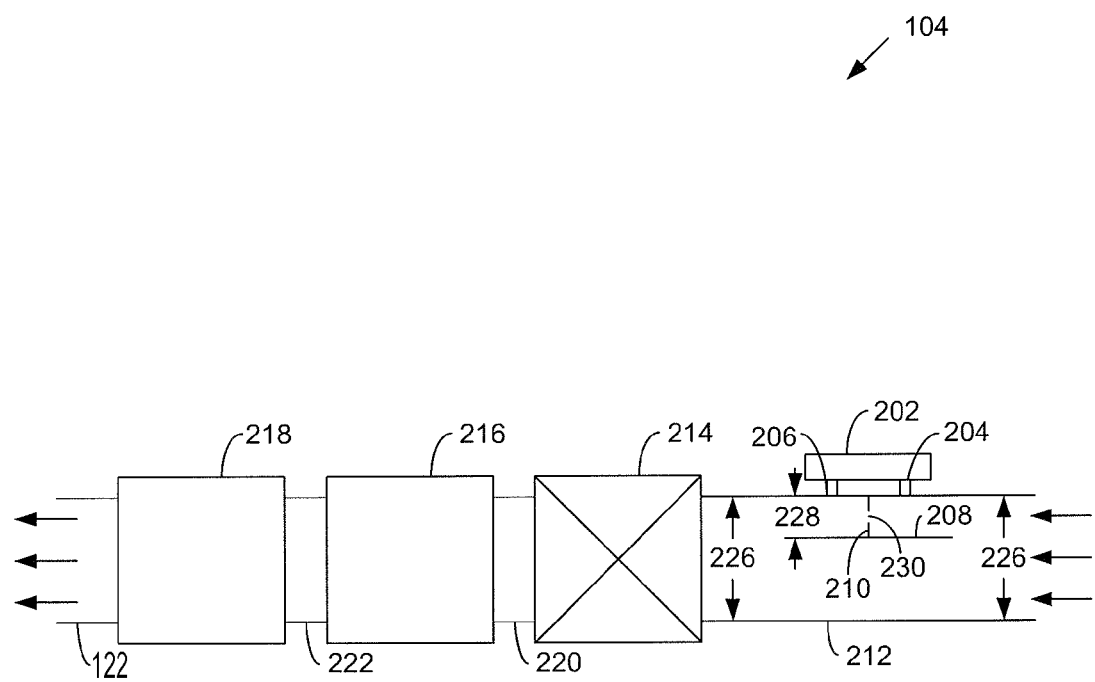
FIG. 2 illustrates a side view of an exhaust gas recirculation system of the exhaust system of FIG. 1 in greater detail as a longitudinal cross-section.

FIG. 2 illustrates a side view of exhaust gas recirculation system 104 in greater detail as a longitudinal cross-section. A portion of the exhaust gas flow stream discharged by engine 102 may be diverted to EGR system 104 via exhaust passage 122. As exhaust gas enters EGR system 104, it may first be directed through flow measurement area, or region, 212 having a diameter 226. The recirculated exhaust gas stream flowing through flow measurement area 212 may then be separated into a first separated flow along a first parallel flow path and a separated second flow along a second parallel flow path as a portion of the exhaust flow stream entering the flow measurement area may be diverted through a flow restriction region 208. The first flow, diverted through flow restriction region 208, may then flow through an orifice 230 formed by orifice plate 210 within flow restriction region 208. The second separated flow may then be allowed to flow adjacent to and/or around flow restriction region 208 depending upon the location of the flow restriction region.

Although shown arranged at a location not coincident with the center region of flow measurement area 212, other embodiments may arrange for the center longitudinal axis 316 of flow restriction region 208 (see FIG. 3A) to be arranged at various other locations within flow measurement area 212 such as a location where the separated first flow would be at least partially and/or fully surrounded by the separated second flow. Also, the separated flows may occur within a common exterior tubular region, or occur in separate tubes. Further, the separated flows may have an equal or unequal flow length, and may have a similarly or differently shaped flow region, length, and/or cross section.

Additionally, in some embodiments the separated second flow may be substantially larger than the separated first flow. For instance, the volumetric flow rate of the separated second flow may be ten times (or more) larger than the volumetric flow rate of the separated first flow (e.g., due to differently sized flow areas, flow resistances, etc.). Correspondingly, in some embodiments the separated second flow may include a greater mass flow than the first separated flow. In other embodiments, the ratio defined by the volumetric flow rates of the second and first separated flows may be smaller or larger. For example ratios such as 12:1, 8:1, 7.5:1, 5:1, or other suitable ratios may be used. Likewise, the volumetric flow rate ratio may be proportional to a separated flow area ratio which may be defined as the ratio of the cross-sectional flow area of flow measurement area 212 less the cross-sectional flow area of flow restriction region 208 to the cross-sectional area of flow restriction region 208.

As illustrated by FIG. 2, pressure taps 204 and 206 may be arranged upstream and downstream of orifice plate 210, respectively. Pressure taps 204 and 206 may also be linked to pressure sensor 202 which may be configured to sense a pressure differential, $P_a$, across orifice 230. Flow restriction region diameter 228, the diameter of orifice 230, and $P_a$ may be utilized by controller 116 to calculate the volumetric flow rate of the first separated flow (the flow through flow restriction region 208) via application of Bernoulli's equation, for example. The volumetric flow rate of the second separated flow may then be calculated by multiplying the calculated volumetric flow rate through flow restriction region 208 by the separated flow area ratio. An overall volumetric flow rate through flow measurement area 212 may then be arrived at by summing the volumetric flow rates of the first and second separated flows.

By utilizing a flow restriction region that is proportionally smaller than the overall flow measurement area, a more consistent, less variable overall volumetric flow rate calculation may be realized. Additionally, the dynamic range of accurate orifice pressure differential measurement in such configurations may be greater than that of larger, center-of-flow stream orifice flow measurement configurations that directly measure the overall volumetric flow rate through a flow measurement area. Typically, larger, substantially center-of-flow stream orifice flow measurement configurations require greater flow through an orifice to accurately measure the pressure drop across the orifice and hence calculate the overall volumetric flow rate through the flow measurement area. Therefore, at lower overall flow rates, volumetric flow rate calculations with such a configuration may be rife with inaccuracies. Furthermore, the restriction to EGR flow produced by larger in-stream orifice flow measurement configurations may not be accurately predicted or accounted for in EGR system calibration and may lead to additional overall EGR flow rate calculation error.

The packaging of an EGR system that utilizes a flow restriction region that is proportionally smaller than the overall flow measurement area may also be smaller than that of a larger in-stream orifice flow measurement configuration. Thus, restriction to flow may be decreased and desired packaging characteristics may be realized.

After exiting flow restriction region 208, the separated first flow may be combined with the separated second flow to form a single EGR flow stream within flow measurement area 212. The combined exhaust flow may then be directed (via EGR valve 214 and exhaust passage 220) to an exhaust oxidation catalyst (EOC) 216 that may reduce unburned hydrocarbons and carbon monoxide in the recirculated exhaust gas flow stream. The portion of the exhaust gas flow discharged by engine 102 that is allowed to pass through EGR system 104 and returned to engine 102 may be metered by the measured actuation of EGR valve 214 which may be controlled by controller 116. The actuation of EGR valve 214 may be based on various vehicle operating parameters and the calculated overall EGR flow rate through flow measurement area 212 (as described in greater detail in regards to FIG. 5).

Once processed by EOC 216, the EGR flow stream may then be directed to EGR cooler 218 via exhaust passage 222. EGR cooler 218 may act to lower the overall temperature of the EGR flow stream before passing the stream on to air intake manifold 112 via exhaust passage 122 where it may be combined with fresh air and directed to engine 102 via exhaust passage 114.

In an alternate approach, one or more of the separated flows may pass through an oxidation catalyst, EGR cooler, additional valve, or other device before being combined in the EGR passage and entering the intake manifold. Also, the EGR valve may be located upstream of the flow measurement area.

Figure 3A:
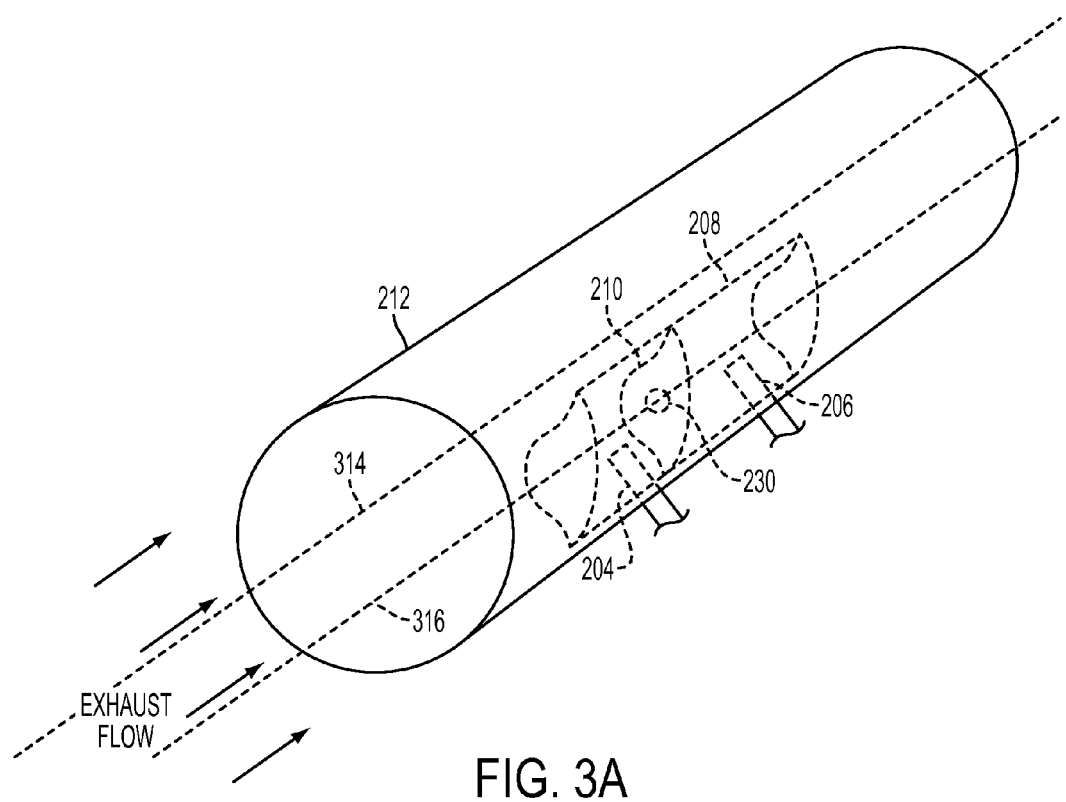
FIG. 3A illustrates a perspective view of the flow measurement area of FIG. 2 in greater detail as a longitudinal cross-section.

FIG. 3A illustrates one particular embodiment via a perspective view as a longitudinal cross-section of an example flow measuring area that may be used as flow measuring area 212 of FIG. 2. As illustrated, longitudinal axis 316 of restricted flow region 208 is parallel to longitudinal axis 314 of flow measurement area 212. In some embodiments, restricted flow region 208 may be arranged within flow measurement area 212 such that the smallest distance between longitudinal axis 316 and the outer wall of flow measurement area 212 is less than the distance between longitudinal axis 316 and longitudinal axis 314.

In other embodiments, restricted flow region 208 may be arranged within flow measurement area 212 such that the smallest distance between longitudinal axis 316 and the outer wall of flow measurement area 212 is greater than or equal to the distance between longitudinal axis 316 and longitudinal axis 314. By configuring flow restriction region 208 within flow measurement area 212 (and not separate from flow measurement area 212) in this example, overall packaging dimensions may be decreased and additional componentry costs may be reduced.

Additionally, alternative embodiments may utilize flow restriction regions with different geometries. For example, in some embodiments, the overall length of flow restriction area 208 may be three inches. In other embodiments, the overall length of flow restriction area 208 may be two inches, four inches or other suitable length. Also, alternative embodiments may differ as to the location of flow restriction area 208 relative to longitudinal axis 314 of flow measurement area 212. For example, the point at which exhaust gases enter flow restriction area 208 may be arranged at a location coincident with a line bisecting longitudinal axis 314. In other embodiments, the point at which exhaust gases enter flow restriction area 208 may be arranged at a location on either side of the line bisecting longitudinal axis 314.

As shown, pressure taps 204 and 206 may be arranged upstream and downstream of orifice plate 210, respectively. In various embodiments, the distance between the pressure taps and orifice plate may vary. For example, in one embodiment, pressure tap 204 may be arranged one inch upstream of orifice plate 210 and pressure tap 206 may be arranged one inch downstream of orifice plate 210. In another embodiment, pressure tap 204 may be arranged 0.5 inch, 2 inches, or another suitable distance upstream of orifice plate 210 and pressure tap 206 may be arranged one-half inch, two inches, or another suitable distance downstream of orifice plate 210.

Figure 3B:
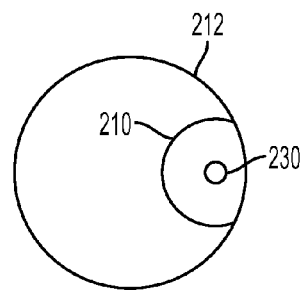
FIG. 3B illustrates a cross-sectional view of the flow measurement area of FIG. 2 that is configured with a flow restriction region that has a cross-section that is substantially round in shape.
Figure 3C:
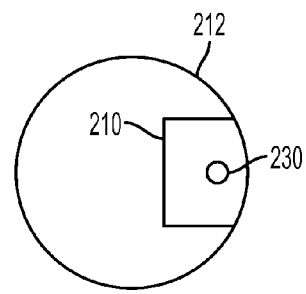
FIG. 3C illustrates a cross-sectional view of the flow measurement area of FIG. 2 that is configured with a flow restriction region that has a cross-section that is substantially rectangular in shape.

FIGS. 3B and 3C illustrate alternative embodiments of the cross-sectional shape of flow restriction region 208 and orifice plate 210. FIG. 3B illustrates the cross-sectional shape of flow restriction region 208 and orifice plate 210 as being substantially circular. Orifice 230, as formed by orifice plate 210 may be configured with a diameter of one inch, for example. Other embodiments may configure orifice 230 with a 0.5 inch diameter, a 2 inch diameter, or other suitable diameter.

FIG. 3C illustrates the cross-sectional shape of flow restriction region 208 and orifice plate 210 as being substantially rectangular. Other embodiments may configure the cross-sectional shape of flow restriction region 208 and orifice plate 210 as being substantially elliptical, octagonal, hexagonal, triangular, or other suitable shape. Additionally, some embodiments may disclose orifice plate 210 as having a nominal thickness of 0.25 inches. Other embodiments may disclose orifice plate 210 as having a nominal thickness of 0.10 inches, 0.5 inches, 1.5 inches, 2 inches, or other suitable thickness.

Figure 4:
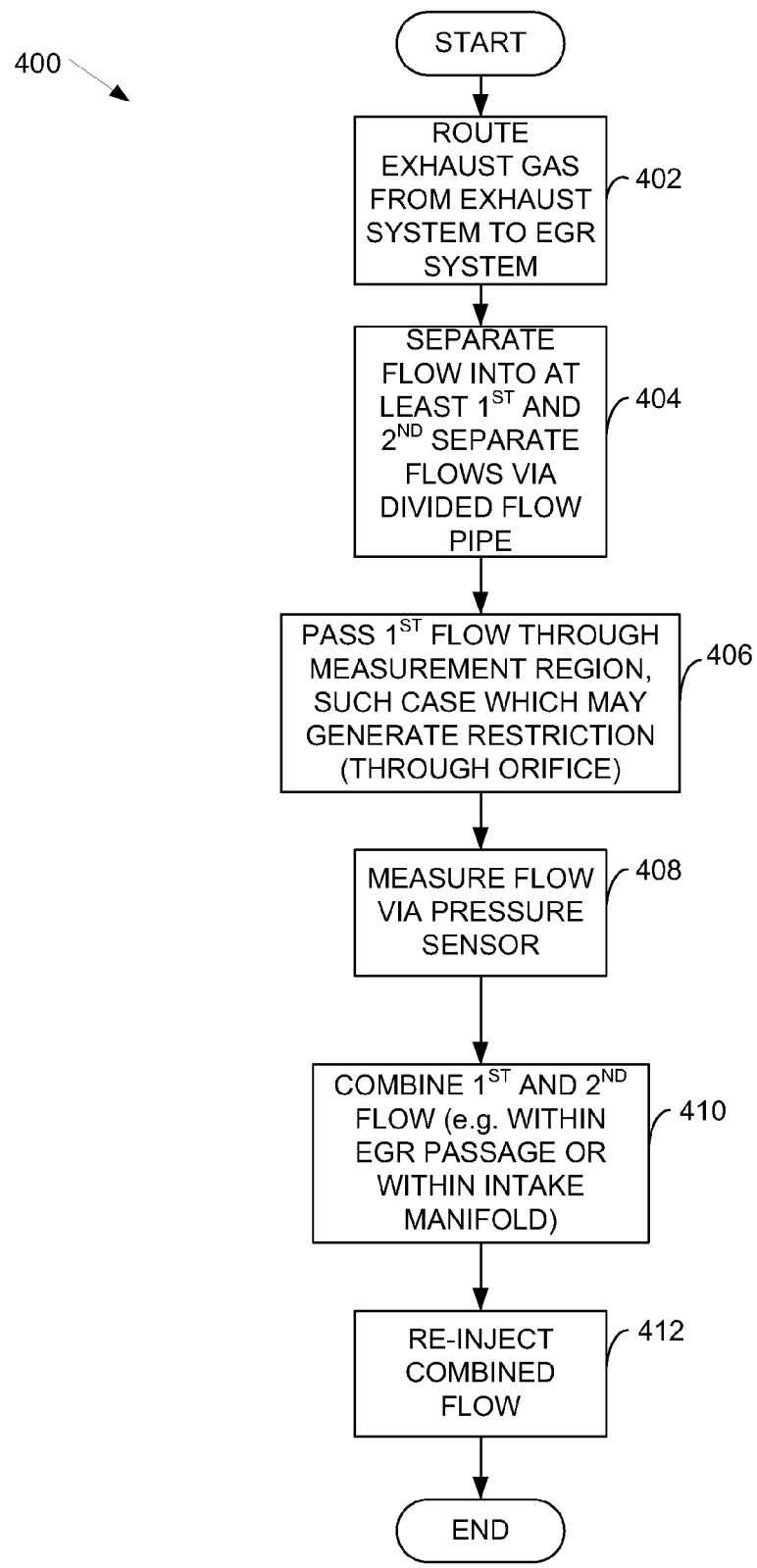
FIG. 4 shows a flow chart depicting an example routine 400 for processing the flow of an engine exhaust gas stream through a flow measurement region of an EGR system.

FIG. 4 shows a flow chart depicting an example routine 400 for processing the flow of an exhaust gas stream through flow measurement area 212 of EGR system 104. At 402, a portion of the exhaust gas flow stream exited by engine 102 may be diverted from exhaust passage 118 to EGR system 104 via exhaust passage 122. At 404, the exhaust gas flow stream diverted to EGR system 104 may enter flow measurement area 212 and may then be separated into a first separated flow and a second separated flow via flow restriction area 208. At 406, the first separated flow may be directed through flow restriction region 208 where it may be directed through an orifice formed by orifice plate 210. At 408, a pressure drop across orifice plate 210 may be sensed by pressure sensor 202 via pressure taps 204 and 206 which may be located upstream and downstream of orifice plate 210, respectively. An overall volumetric flow rate through flow measurement area 212 may then be ascertained (as described in greater detail herein).

At 410, the first separated flow, after traversing flow restriction region 208, may be combined with the second separated flow that has bypassed flow restriction region 208. Finally, at 412, the combined flow may be directed through recirculation valve 214, EOC 216, cooler 218, and air intake manifold 112 where it may be combined with fresh air and directed to engine 102 via exhaust passage 114 (as described in greater detail herein).

Figure 5:
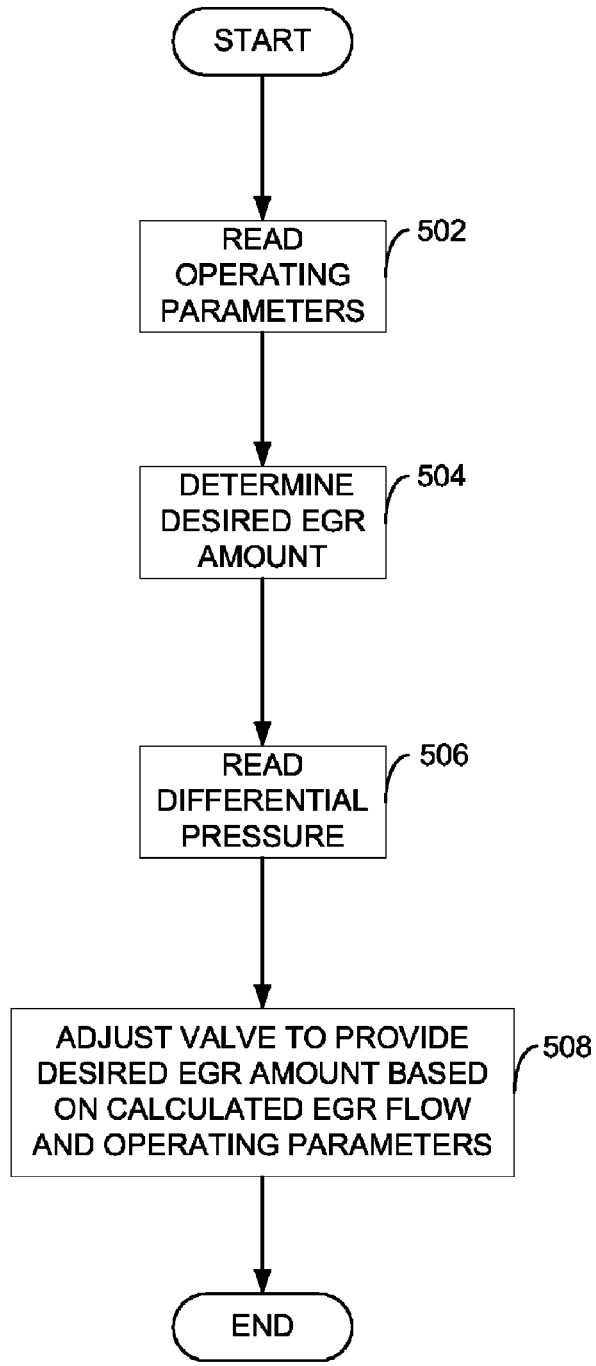
FIG. 5 shows a flow chart depicting an example routine for adjusting an amount of exhaust gas recirculation based on vehicle operating parameters and a differential pressure measured within a flow restriction region.

FIG. 5 shows a flow chart depicting an example routine for adjusting an amount of exhaust gas recirculation based on vehicle operating parameters and a differential pressure measured within flow restriction region 208. At 502, a vehicle PCM may read various operating parameters such as vehicle speed, engine load, air/fuel ratio, and exhaust temperature, for example. Based on the operating parameters read at 502, a desired amount of exhaust gas recirculation may be determined at 504. At 506, the vehicle PCM may read a differential pressure across orifice plate 210 that may then be used to calculate an overall volumetric flow rate through flow measurement area 212.

At 508, EGR valve 214 may be adjusted based on the EGR volumetric flow rate calculated at 506 to produce the desired amount of exhaust gas recirculation determined at 504. An engine load/speed look-up table may be utilized to determine a desired percentage of the overall gas stream directed to engine 102 that is comprised of recirculated exhaust gases. The following equation may then be utilized to calculate a desired EGR mass flow rate, DES EM:

$$DES\ EM = Am * \%EGR/(1-\%EGR)$$

where Am represents an air mass flow rate entering air intake manifold 112 and % EGR represents the desired percentage of the overall gas stream directed to engine 102 that is comprised of recirculated exhaust gases. A look-up table that relates DES EM to a desired pressure differential across orifice plate 210, $P_d$, may then be utilized to determine a desired differential pressure across orifice plate 210. Controller 116 may then utilize the actual pressure differential sensed across orifice plate 210 by pressure sensor 202 via pressure taps 204 and 206, $P_a$, to control EGR valve 214 to actuate so as to produce a pressure differential across orifice plate 210 that is closer to the desired pressure differential, $P_d$. In this way, the EGR valve may be adjusted to accurately control the total EGR flow, even though only a portion of the EGR flow is measured.

Figure 6:
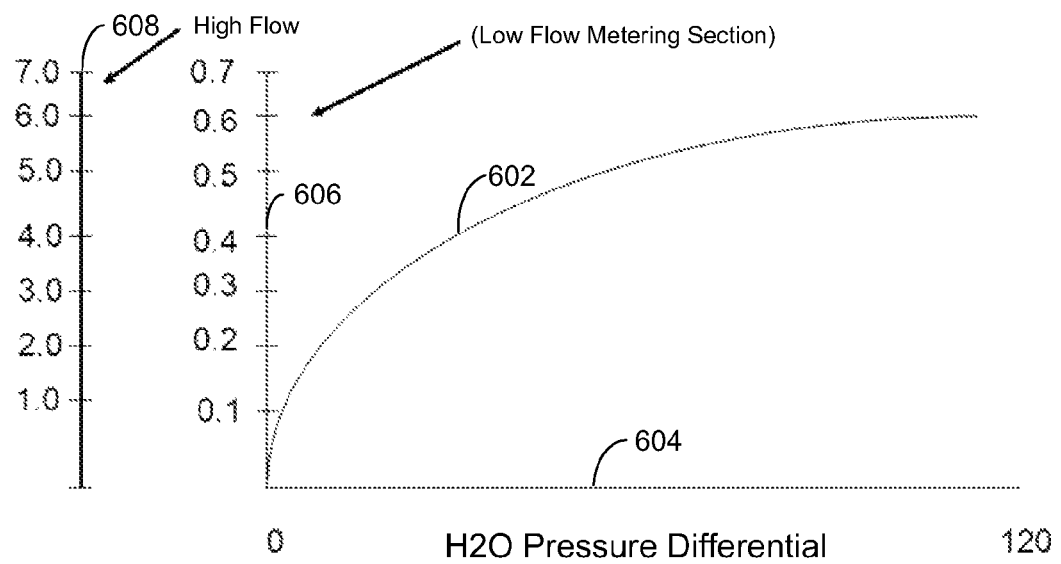
FIG. 6 depicts a graphical representation of a theoretical flow curve through an EGR system flow measurement area.

FIG. 6 depicts a graphical representation of a theoretical flow curve 602 through flow measurement area 212 of exhaust gas recirculation system 104. In this graphical representation, horizontal axis 604 represents the pressure differential across orifice plate 210 as measured by pressure sensor 202 via pressure taps 204 and 206. Additionally, vertical axis 606 represents the mass flow rate of the separated first flow through flow restriction region 208 and vertical axis 608 represents the mass flow rate of the separated second flow next to and/or around flow restriction region 208 (through flow measurement area 212).

In this representation, the mass flow rate of the separated second flow is shown to be approximately ten times larger than the mass flow rate of the separated first flow. In other embodiments, the ratio defined by the mass flow rates of the second and first separated flows may be smaller or larger, such as 12:1, 8:1, 7.5:1, 5:1, or other suitable ratio. At lower overall EGR mass flow rates, a configuration that utilizes a smaller orifice plate that receives a separated first flow that is proportionally smaller than a separated second flow may produce a more pronounced, measurable pressure drop across an orifice plate than may be exhibited by a larger, substantially center-of-flow stream orifice flow measurement configuration at the same lower overall EGR mass flow rate. A more reliable, robust configuration for measuring EGR mass flow at both higher and lower EGR mass flow rates may thus be realized. Correspondingly, the actuation of EGR valve 214 may be based on more accurate real-time EGR flow calculations which may result in finer, more precise control of overall EGR flow.

Note that the example routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system, where the code is executable by the computer.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for measuring exhaust gas recirculation (EGR) flow in an engine, comprising:
    separating an initial EGR flow into at least a first separated flow and a second separated flow;
    passing only the separated first flow through a flow restriction region, where the first flow passes through the flow restriction region separately from the second flow;
    combining the first and second separated flows into a combined EGR flow,
    passing the combined EGR flow through a cooler, and
    inducting the combined EGR flow into a cylinder of the engine, where the initial EGR flow is separated and the first and second separated flows are combined within a common EGR passage.

2. The method of claim 1 wherein the second separated flow includes a greater mass flow than the first separated flow.

3. The method of claim 2 wherein the separated first flow is at least partially surrounded by the separated second flow, and the first and second separated flows both travel at least partially along a common wall.

4. The method of claim 3 further comprising measuring the first separated flow while it is separated from the second separated flow.

5. The method of claim 4 further comprising compressing the combined EGR flow.

6. The method of claim 4 further comprising correlating the measured first separated flow to the combined flow and adjusting an EGR valve in response thereto.

7. The method of claim 6 wherein the restriction region includes an orifice plate with a first pressure tap upstream of the orifice plate and a second pressure tap downstream of the orifice plate.

8. The method of claim 6 further comprising passing the combined EGR flow through a cooler and an exhaust oxidation catalyst.

9. The method of claim 1, wherein between the steps of separating an initial EGR flow and combining the first and second separated flows into a combined EGR flow, the method further comprising passing the second separated flow through an unrestricted region that allows free movement of the second separated flow.

10. A system for an engine having an intake and exhaust manifold, comprising:
   a diesel fuel system;
   a turbocharger coupled between the intake and exhaust manifolds, the turbocharger having a compressor and a turbine;
   an EGR system coupled between upstream of the turbine and upstream of the compressor, the EGR system further having:
      an exhaust oxidation catalyst;
      a cooler;
      an EGR valve upstream of the exhaust oxidation catalyst and cooler;
      a flow measurement region upstream of the EGR valve, the flow measurement region including at least a first and second parallel flow path, with the first path obstructed by an orifice plate and the second path bypassing the first path, where a flow area of the second path is substantially greater than a flow area of the first path; and
      a differential pressure sensor coupled in the EGR system to measure a differential pressure across the orifice plate via pressure taps located upstream and downstream of the orifice plate.

11. The system of claim 10 where the orifice is circular.

12. The system of claim 11 where the second path at least partially surrounds the first path, and a common wall defines at least part of the second path and part of the first path.

13. The system of claim 12 wherein the first path and second path are formed in a tubular region of the EGR system.

14. The system of claim 13 where the tubular region is substantially straight.

15. A method for measuring exhaust gas recirculation (EGR) flow in an engine, comprising:
   separating an initial EGR flow into two separated flows including a first separated flow and a second separated flow;
   passing the separated first flow through a first flow path having a flow restrictor positioned within the first path, where the first flow passes through the first path separately from the second flow;
   passing only the second separated flow through a second flow path free of additional restriction;
   combining the first and second separated flows into a combined EGR flow and inducting the combined EGR flow into a cylinder of the engine, where the combined EGR flow is controlled by a common EGR valve, and where the second separated flow includes a greater mass flow than the first separated flow; and
   correlating the first separated flow to the combined EGR flow and adjusting the EGR valve in response thereto.

16. The method of claim 15 wherein the separated first flow is at least partially surrounded by the separated second flow, and a common wall defines at least part of the second path and part of the first path.

17. The method of claim 15 further comprising measuring the first separated flow while it is separated from the second separated flow.

18. The method of claim 17 further comprising compressing the combined EGR flow.

19. The method of claim 15 wherein the flow restrictor includes an orifice plate with a first pressure tap upstream of the orifice plate and a second pressure tap downstream of the orifice plate.

20. The method of claim 19 further comprising passing the combined EGR flow through a cooler and an exhaust oxidation catalyst.

* * * * *